United States Patent
Kalbasi et al.

(10) Patent No.: US 8,942,316 B2
(45) Date of Patent: Jan. 27, 2015

(54) WIRELESS COMMUNICATION SYSTEM WITH SIGNAL PROCESSING MECHANISM AND METHOD OF OPERATION THEREOF

(71) Applicant: Samsung Electronics Co., Ltd., Gyeonggi-Do (KR)

(72) Inventors: Reza Kalbasi, La Jolla, CA (US); Inyup Kang, San Diego, CA (US); Kwangman Ok, San Diego, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 21 days.

(21) Appl. No.: 13/833,364

(22) Filed: Mar. 15, 2013

(65) Prior Publication Data
US 2014/0269878 A1  Sep. 18, 2014

(51) Int. Cl.
*H04L 25/10* (2006.01)
*H04L 25/06* (2006.01)
*H04L 25/03* (2006.01)
*H04L 27/22* (2006.01)

(52) U.S. Cl.
CPC .......... *H04L 25/06* (2013.01); *H04L 25/03878* (2013.01); *H04L 27/22* (2013.01)
USPC ...................................................... 375/319

(58) Field of Classification Search
CPC .... H04L 25/061; H04L 25/062; H04L 12/413
USPC .................. 375/319, 224, 316; 327/238, 254; 455/68, 232.1
See application file for complete search history.

(56) References Cited

U.S. PATENT DOCUMENTS

| | | | |
|---|---|---|---|
| 6,327,313 B1 | 12/2001 | Taylor et al. | |
| 6,370,205 B1 | 4/2002 | Lindoff et al. | |
| 6,400,928 B1 | 6/2002 | Khullar et al. | |
| 6,445,736 B1 | 9/2002 | Wheeler | |
| 6,504,884 B1 | 1/2003 | Zvonar | |
| 6,836,515 B1 | 12/2004 | Kay et al. | |
| 7,257,385 B2 * | 8/2007 | Ono et al. | 455/232.1 |
| 2003/0174079 A1 * | 9/2003 | Soltanian et al. | 341/118 |
| 2008/0089391 A1 | 4/2008 | O'Shea | |
| 2009/0196334 A1 | 8/2009 | Bai et al. | |
| 2012/0201336 A1 | 8/2012 | McNamara | |
| 2014/0119418 A1 * | 5/2014 | Noest et al. | 375/224 |

FOREIGN PATENT DOCUMENTS

WO 2012-022798 A1 2/2012

OTHER PUBLICATIONS

International Search Report for PCT Application No. PCT/KR2013/004318 dated Dec. 16, 2013.
Lindof, B., "Using a direct conversion receiver in EDGE terminals-A new DC offset compensation algorithm," PIMRC, London, England, Sep. 2000, pp. 959-963.
Hui, D., Lindof, B., and Zangi, K., "Enhanced DC estimation via sequence-specific frequency offset," VTC Fall, Vancouver, BC, Canada, Sep. 2002, pp. 161-165.

* cited by examiner

*Primary Examiner* — Khai Tran
(74) *Attorney, Agent, or Firm* — IP Investment Law Group

(57) ABSTRACT

A method of operation of a wireless communication system includes: receiving a received signal; generating concurrently a first modulation data and a second modulation data from the received signal; calculating an error energy for the first modulation data and the second modulation data; and removing a residual Direct Current (DC) offset from the received signal based on determining a minimum of the error energy for the first modulation data or the second modulation data.

18 Claims, 6 Drawing Sheets

WIRELESS COMMUNICATION SYSTEM WITH SIGNAL PROCESSING MECHANISM AND METHOD OF OPERATION THEREOF

TECHNICAL FIELD

An embodiment of the present invention relates generally to a wireless communication system, and more particularly to a system for optimizing a multi-standard wireless communication.

BACKGROUND

Wireless communication systems typically employ one or more modulation scheme to communicate voice, data and control information between the base station and a mobile terminal. In the wireless communication systems employing multiple modulation schemes, the mobile terminal must be either informed of the modulation type in advance or should detect it from the received data. Informing the mobile terminal the modulation type for each burst before the transmission of the information requires sending extra information conveying the modulation types from the transmitter to the receiver and it requires extra bandwidth.

In addition, the mobile terminals are required to be small and low cost. The receiver architecture based on direct conversion can fulfill the cost and size requirements, because the direct conversion receiver can eliminate components, such as image rejection filter and IF (Intermediate Frequency) mixer. However, a direct conversion receiver suffers from DC offset problems, which can cause the receiver to lose connection and drop calls.

Direct current (DC) offset in receivers presents a major problem for receiver performance. The most popular idea for reducing the DC offset is do long-term averaging of the baseband signal and removing the DC by subtracting the DC estimate. However, in the EDGE systems, DC offsets are different for different frequencies due to the frequency hopping performed as part of the standard. Therefore long-term averaging is not possible in EDGE systems. Further, the training sequences in EDGE do not have zero mean and short-term averaging over only one EDGE burst (≈140-150 data samples) which gives rise to residual DC offset that can degrade the receiver performance.

Thus, a need still remains for wireless communication system with signal processing mechanism to identify the modulation scheme, estimate the communication channel, and resolve DC offset problems in the receiver. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a method of operation of a wireless communication system including: receiving a received signal; generating concurrently a first modulation data and a second modulation data from the received signal; calculating an error energy for the First modulation data and the second modulation data; and removing a residual Direct Current (DC) offset from the received signal based on determining a minimum of the error energy for the First modulation data or the second modulation data.

An embodiment of the present invention provides a wireless communication system, including: an input buffer configured to receive the received signal; a first phase shifter and a second phase shifter, coupled to the input buffer configured to concurrently generate a first modulation data and a second modulation data from the received signal; a channel estimation module, coupled to the first phase shifter and the second phase shifter, configured to generate an error energy for the First modulation data and the second modulation data; and a Direct Current (DC) offset removal module, coupled to the channel estimation module, configured to remove a residual DC offset from the received signal based on a minimum of the error energy between the First modulation data or the second modulation data detected.

An embodiment of the present invention provides a wireless communication system including: a communication unit configured to receive a received signal; a first phase shifter and a second phase shifter, coupled to the received signal from the communication unit, configured to concurrently process a selected burst to generate a first modulation data and a second modulation data; a channel estimation module, coupled to the first phase shifter and the second phase shifter, configured to calculate an error energy for the first modulation data and the second modulation data; and a direct current (DC) offset removal module configured to remove a residual direct current (DC) offset from the received signal based on a minimum of the error energy for the first modulation data or the second modulation data determined.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
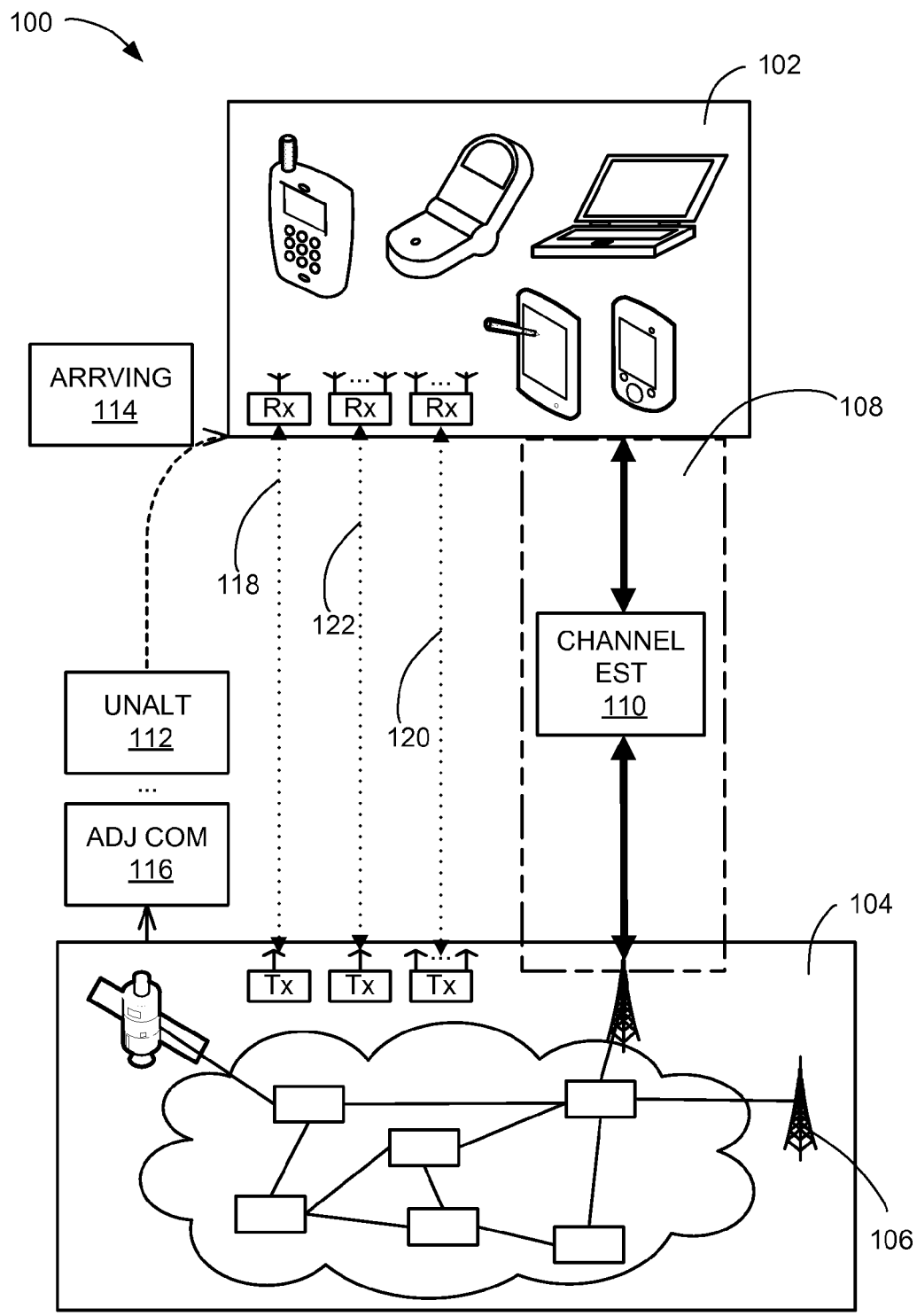
FIG. 1 is a wireless communication system with signal processing mechanism in an embodiment of the present invention.

The embodiment of the present invention provides a system and method for wireless communications system employing multiple modulation schemes to estimate the channel characteristic, resolve residual DC offset, and detect the modulation type. This technique merges channel estimation, modulation detection, and DC offset resolution in one block and improves the performance over the sequential processing of channel, modulation, and residual DC offset estimation. The embodiment of the present invention provides an estimate of the channel characteristic and the residual DC offset without prior knowledge of the modulation type. The joint parameter estimation of the embodiment of the present invention can improve performance while reducing the number of signal processing blocks required for parameter identification. The processing of these three different baseband functions in a single block reduces the baseband signal processing complexity and decreases the power consumption of a mobile device, therefore it reduces the battery size of mobile device.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

The embodiment of the present invention provides that the offset adjustment field can be used by the modulation selection module to reduce the baseband signal processing complexity and decrease the power consumption of the wireless communication system. The modulation selection module can calculate adjustments for the noise component $v_{m,i}$, the channel component $\tilde{h}_{m,i}^{1}$, and the DC offset component $R_{DC}$ present in the time division multiple access (TDMA) frame.

The term "module" referred to herein can include software, hardware, or a combination thereof in an embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a wireless communication system 100 with signal processing mechanism in an embodiment of the present invention. The wireless communication system 100 includes a mobile device 102, such as a cellular phone or a notebook computer, connected to a network 104. The network 104 is defined as a system of wired or wireless communication devices that are connected to each other for enabling communication between devices.

For example, the network 104 can include a combination of wires, transmitters, receivers, antennas, towers, stations, repeaters, telephone network, servers, or client devices for a wireless cellular network. The network 104 can also include a combination of routers, cables, computers, servers, and client devices for various sized area networks.

The network 104 can include a base station 106 for directly linking and communicating with the mobile device 102. The base station 106 can receive wireless signals from the mobile device 102, transmit signals to the mobile device 102, process signals, or a combination thereof. The base station 106 can also relay signals between other base stations, components within the network 104, or a combination thereof.

The mobile device 102 can be connected to the network 104 through the base station 106. For example, the base station 106 can include or be with a cell tower, a wireless router, an antenna, a processing device, or a combination thereof being used to send signals to or receive signals from the mobile device 102, such as a smart phone or a laptop computer. The mobile device 102 can connect to and communicate with other devices, such as other mobile devices, servers, computers, telephones, or a combination thereof.

The base station 106 can be used to wirelessly exchange signals for communication, including voice signals of a telephone call or data representing a website and interactions therewith. The base station 106 can also transmit reference signals, training signals, error detection signals, error correction signals, header information, transmission format, protocol information, or a combination thereof.

Based on the communication method, such as global system for mobile-communication (GSM), Enhanced Rates for GSM Evolution (EDGE), second generation (2G), third generation (3G), or fourth generation (4G) standards, the communication signals can include reference portions, header portions, format portions, error correction or detection portion, or a combination thereof imbedded in the communicated information. The reference portions, header portions, format portions error correction or detection portion, or a combination thereof can include a predetermined bit, pulse, wave, symbol, or a combination thereof. The various portions can be embedded within the communicated signals at regular time intervals, frequency, code, or a combination thereof.

The mobile device 102 can communicate with the base station 106 through a channel 108. The channel 108 can be wireless, wired, or a combination thereof. The channel 108 can be a direct link between the mobile device 102 and the base station 106 or can include repeaters, amplifiers, or a combination thereof. For example, the channel 108 can include communication frequency, time slot, packet designation, transmission rate, channel code, or a combination thereof used for transmitting signals between the mobile device 102 and the base station 106.

The channel 108 and the effects thereof can be represented by a channel estimate 110. The channel estimate 110 is defined as a description of changes to signals caused by the channel 108. The channel estimate 110 can described to quantize reflection, loss, refraction, obstructions, or a combination thereof that a signal can experience while traversing between the base station 106 and the mobile device 102. The channel estimate 110 can further characterize interference that the mobile device 102 can experience from other transmitters, such as other mobile devices or other base stations, or from the movement of the mobile device 102.

For example, the base station 106 can transmit an unaltered transmission 112. The unaltered transmission 112 can change while traversing through the channel 108 due to the qualities therein, such as from delayed signal reflections from various buildings, from interferences other nearby transmitting sources, from the Doppler Effect experienced when the mobile device 102 is in transit, or a combination thereof. The mobile device 102 can receive an arriving communication 114, which is the unaltered transmission 112 that has been changed due to qualities of the channel 108.

The mobile device 102 can determine the channel estimate 110 from the arriving communication 114. For example, the mobile device 102 can compare the information in the reference or training portion to the standardized or intended information in the reference or training portion to estimate the channel estimate 110.

The wireless communication system 100 can employ link adaptation methods for controlling the communication between devices. Link adaptation method can have the mobile device 102 feedback and report information associated with the channel 108 to the base station 106. The base station 106 can use the feedback information to adjust various aspects of the communication with the mobile device 102.

The wireless communication system 100 employing link adaptation method can inherently have a delay between characterizing the channel 108 based on a communication, feeding information back to the base station 106, and making the adjustment based on the communication. The delay can cause the adjustments to be incorrect due to changes in the channel 108 during the delay.

For example, the mobile device 102 can characterize the channel 108 based on the arriving communication 114 corresponding to the unaltered transmission 112. The characterization of the channel 108 will represent the channel estimate 110 at the time of receiving the arriving communication 114. The channel 108 can change during the time necessary to determine the channel estimate 110, send feedback information to the base station 106, and have the base station 106 make adjustments accordingly. Hence, the adjustments made based on the arriving communication 114 may not be relevant due to changes in the channel 108 at the time of transmitting an adjusted communication 116.

For illustrative purposes, the base station 106 will be described as transmitting signals and the mobile device 102 as receiving and replying to the transmitted signals. However, it is understood that both the mobile device 102 and the base station 106 can each transmit and receive signals.

Also for illustrative purposes, the wireless communication system 100 will be described as employing a single-input single-output (SISO) scheme 108 for communicating with one antenna on the transmitter and one antenna on the receiver. However, it is understood that the wireless communication system 100 can employ a multiple-input multiple-output (MIMO) scheme 118 including a single-input multiple-output (SIMO) scheme 120 and a multiple-input single-output (MISO) scheme 122. The multiple-input multiple-output scheme 118 can have one or more antennas on the transmitter end, at the base station 106, communicating with one or more antennas on the receiver end, at the mobile device 102.

The multiple-input multiple-output scheme 118 can include the single-input multiple-output scheme 120 having a single antenna at the base station 106 communicating with multiple antennas on the mobile device 102. The multiple-input multiple-output scheme 118 can further include the multiple-input single-output scheme 122 having multiple antennas at the base station 106 communicating with a single antenna on the mobile device 102.

For further illustrative purposes, the mobile device 102 will be described as directly communicating with the base station 106. However, it is understood that the mobile device 102 can communicate with the base station 106 through other devices, such as a repeater, another mobile device, a router, or a combination thereof. It is also understood that the mobile device 102 can access the network 104 through devices other than the base station 106.

Figure 2:
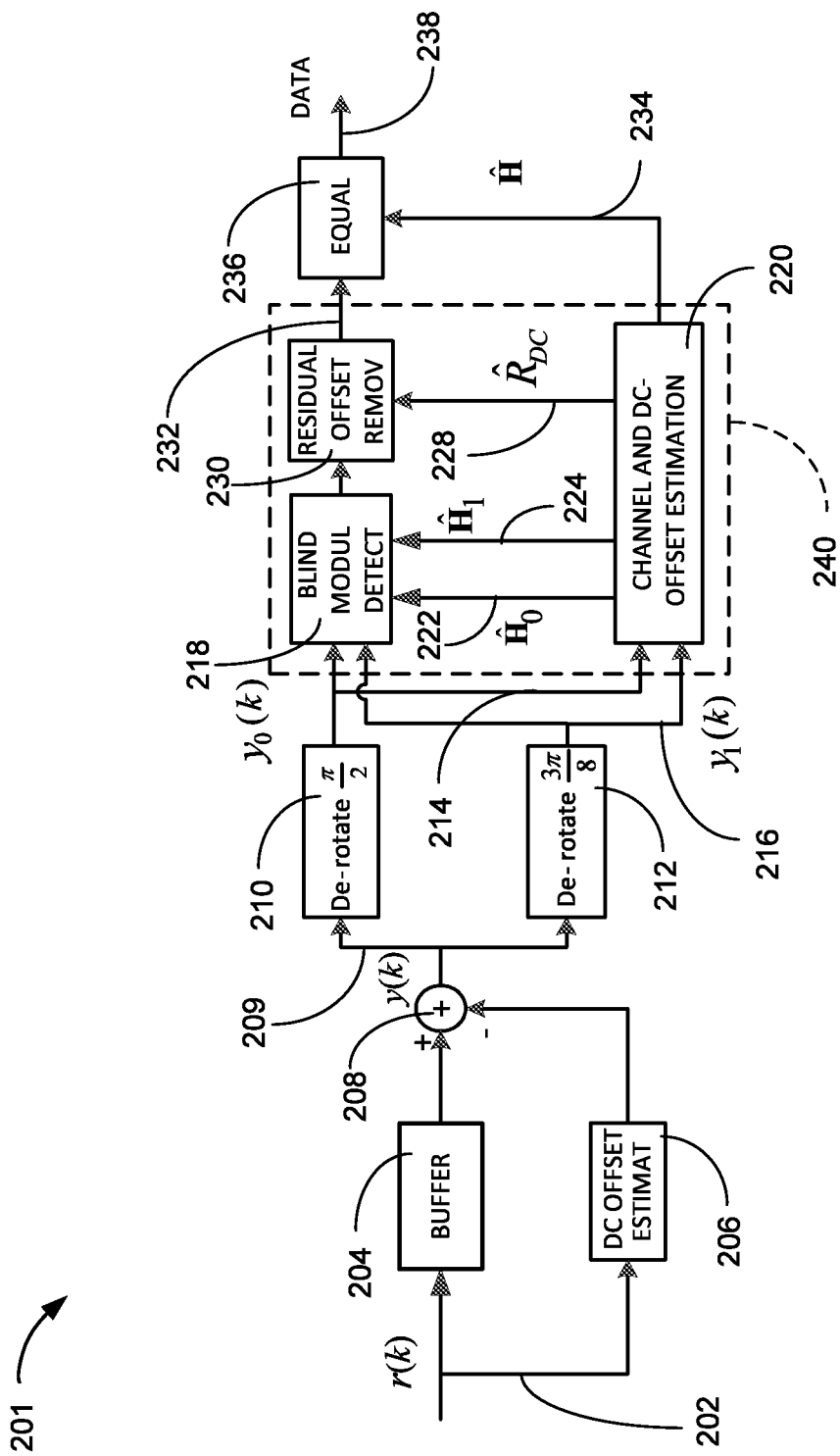
FIG. 2 is an exemplary block diagram of a wideband receiver of the wireless communication system.

Referring now to FIG. 2, therein is shown an exemplary block diagram of a wideband receiver 201 of the wireless communication system 100. The exemplary block diagram of a wideband receiver 201 depicts a received signal 202, such as a radio frequency signal meeting the Enhanced Rates for GSM Evolution (EDGE) standard.

The Enhanced Rates for GSM Evolution (EDGE) has been defined as a transitional standard between 2G and 3G systems. Both Gaussian Minimum Shift Keying (GMSK) and eight Phase Shift Keying (8PSK) modulations are used in EDGE standard, and the modulation type can be changed from burst to burst. GMSK is a non-linear modulation used in GSM and it can be approximated with a 2-level linear modulation with a $\pi/2$ rotation. Similarly, the 8PSK modulation in EDGE is an 8-level modulation with $3\pi/8$ rotation.

The received signal 202 can be coupled to an input buffer 204 and a direct current (DC) offset estimator 206. The input buffer 204 can be a low noise linear amplifier having a fixed gain. The DC offset estimator 206 can be an averaging circuit that determines a mean DC offset value over a burst of the received signal 202. The received signal 202 can be represented by:

$$r_{m,i} = \sum_{k=0}^{L-1} x_{m-k} h_{k,i} + n_{m,i} + m_{DC}, m = 0, \ldots, M-1, i = 0, 1 \quad (1)$$

Where $r_{m,i}$ and $h_{m,i}$ are the i-th sample of the received signal 202 and a channel tap at time k, is the training symbol, $n_{m,i}$ is the i-th sample of the additive white Gaussian noise (AWGN), M is the burst length and $m_{DC}$ is the DC offset. The training symbol $X_k$ is defined as:

$$x_k = u_k e^{jk\theta_i} \quad (2)$$

$$\theta_i = \begin{cases} \dfrac{\pi}{2}; & i = 0 \\ \dfrac{3\pi}{8}; & i = 1 \end{cases}$$

The mean DC offset $\hat{m}_{DC}$ can be estimated by the DC offset estimator 206 by averaging symbols over a selected burst (M=148). The value of the mean DC offset can be calculated by:

$$\hat{m}_{DC} = \frac{1}{148}\sum_{m=0}^{147} r_{m,i} = \frac{1}{148}\sum_{m=0}^{147}\sum_{k=0}^{L-1} x_{m-k} h_{k,i} + \frac{1}{148}\sum_{m=0}^{147} n_{m,i} + m_{DC}; \quad (3)$$

$$i = 0, 1$$

The output of the DC offset estimator 206 can be subtracted from the output of the input buffer 204 by an adder 208. The output of the adder 208 can be a raw data 209 which can be represented by:

$$y_{m,i} = r_{m,i} - \hat{m}_{DC} = \quad (4)$$

$$\sum_{k=0}^{L-1} x_{m-k} h_{k,i} - \frac{1}{148}\sum_{n=0}^{147}\sum_{k=0}^{L-1} x_{n-k} h_{k,i} + n_{m,i} - \frac{1}{148}\sum_{m=0}^{147} n_{m,i};$$

$$m = 0, \ldots, M-1, i = 0, 1$$

The raw data 209 can be coupled to first phase shifter 210 and a second phase shifter 212. The first phase shifter 210 can rotate the raw data 209 by π/2. The first phase shifter 210 can apply a correction for the Gaussian Minimum Shift Keying (GMSK) standard of modulation in order to produce a first modulation data 214.

The second phase shifter 212 can rotate the raw data 209 by 3π/8. The second phase shifter 212 can apply a correction for the eight Phase Shift Keying (8PSK) standard of modulation in order to produce a second modulation data 216.

It is understood that the EDGE standard can alternate the modulation type between bursts. The embodiment of the present invention can concurrently process the received signal 202 for both modulation types. The first modulation data 214 and the second modulation data 216 can be coupled to a blind modulation detector 218 and a channel estimation module 220. It is further understood that only one of the modulation types can be the used in the received signal 202 at any particular time.

The channel estimation module 220 can provide the channel estimation 110 of FIG. 1 for a first modulation adjustment 222, such as an adjustment of the GMSK modulation, and an second modulation adjustment 224, such as an adjustment of the 8PSK modulation. The blind modulation detector 218 can analyze the first modulation data 214 adjusted by the first modulation adjustment 222 and the second modulation data 216 adjusted by the second modulation adjustment 224.

The blind modulation detector 218 can make a determination of which modulation type is used in the received signal 202 based on the error energy for each of the modulation types. The error energy can be calculated by:

$$e_i^l = y_i^{l*}[I_{15-L+1} - \tilde{U}_i(\tilde{U}_i^*\tilde{U}_i)^{-1}\tilde{U}_i^*]y_i^l;\ i,\ l=0, 1 \quad (5)$$

Where $\tilde{U}_i$ represents an array of symbols that are sampled from the middle of a test sequence of 26 symbols located in the burst of the received signal 202 and $I_{15-L+1}$ is an identity matrix of size 15−L+1. The array can be taken from the middle of the test sequence in order to eliminate the first d symbols that include inter-symbol-interference (ISI). The array can be presented as:

$$\tilde{U}_i = \begin{bmatrix} u_{d+15} & \cdots & u_{d+15-L} & e^{-j\theta_i(d+15)} \\ u_{d+14} & \cdots & u_{d+14-L} & e^{-j\theta_i(d+14)} \\ \vdots & \vdots & \vdots & \vdots \\ u_{d+L} & \cdots & u_d & e^{-j\theta_i(d+L)} \end{bmatrix};\ i=0, 1 \quad (6)$$

The error associated with each of the symbols can include a noise component $v_{m,i}$, a channel component $\tilde{h}_{m,i}^l$, and a DC offset component $R_{DC}$. The noise component $v_{m,i}$, the channel component $\tilde{h}_{m,i}^l$ and the DC offset component $R_{DC}$ can be calculated as:

$$v_{m,i} = n_{m,i} - \frac{1}{148}\sum_{m=0}^{147} n_{m,i};\ m = 0, \ldots, M-1, i = 0, 1 \quad (7)$$

and $$R_{DC} = \frac{1}{148}\sum_{n=0}^{147}\sum_{k=0}^{L-1} x_{n-k} h_{k,i}$$

$$\tilde{h}_{m,i}^l = e^{-jm\theta_i} h_{m,i}.$$

The blind modulation detector 218 can determine which modulation type is received by the magnitude of the error energy. If the error energy of the first modulation data 214 is greater than the second modulation data 216, the blind modulation detector 218 determines that the modulation type used is 8PSK. If the error energy of the second modulation data 216 is greater than the first modulation data 214, the blind modulation detector 218 determines that the modulation type used is GMSK.

The channel estimation module 220 can determine a residual DC offset 228 as a by-product of the determination of the channel component $\tilde{h}_{m,i}^l$. The residual DC offset 228 can be coupled to a DC offset removal module 230. The output of the DC offset removal module 230 can be a corrected data 232. The corrected data 232 can be represented by the raw data 209 with the residual DC offset 228 removed.

$$y_{m,i} = e^{-mk\theta_l}\sum_{k=0}^{147} x_{m-k} h_{k,i} - R_{DC} e^{-jk\theta_l} + v_{m,i} e^{-jk\theta_l}; = \quad (8)$$

$$\sum_{k=0}^{147} u_{m-k} \tilde{h}_{k,i} - R_{DC} e^{-jk\theta_l} + \tilde{v}_{m,i}^l;\ m = 0, \ldots, M-1,\ i,\ l = 0, 1$$

The channel estimation module 220 also provides a channel characteristic 234 which is based on the GMSK modulation of the 8PSK modulation as determined by the error energy calculated by the blind modulation detector 218 and equation 5. An equalizer 236 can be coupled to the DC offset removal module 230, to receive the corrected data 232, and the channel estimation module 220 to receive the channel characteristic 234. The equalizer 236 can provide the received data 238. The received data 238 reflects the information that was transmitted through the communication path 104 of FIG. 1.

It has been discovered that the combination of the blind modulation detector 218, the channel estimation module 220, and the DC offset removal module 230 into a modulation selection module 240 to reduce the baseband signal processing complexity and decrease the power consumption of the wireless communication system 100 of FIG. 1. The modulation selection module 240 can generate intermediate terms for the noise component $v_{m,i}$, the channel component $\tilde{h}_{m,i}^l$, and the DC offset component $R_{DC}$. The intermediate terms can represent the test sequence values for a test symbol $y_{m,i}^l$, a test noise $v_i^l$, a test channel characteristic $h_i^l$, and a test gain $g_i^l$, which can be calculated by the channel estimation module 220 as:

$$y_{m,i}^l = [y_{d+15,i}^l, \ldots, y_{d+L,i}^l]^T;\ i,\ l=0, 1$$

$$v_i^l = [\tilde{v}_{d+15,i}^l, \ldots, \tilde{v}_{d+L,i}^l]^T;\ i,\ l=0, 1$$

$$h_i^l = [\tilde{h}_{0,i}^l, \ldots, \tilde{h}_{0,i}^l]^T;\ i,\ l=0, 1$$

$$g_i^l = [h_i^{lT}, -R_{DC}]^T \quad (9)$$

A test data symbol $y_i^l$ can be represented by:

$$y_i^l = \tilde{U}_i g_i^l + v_i^l,\ i,\ l=0, 1 \quad (10)$$

A least square error of the test data symbol can be calculated by:

$$e_i^l = \|y_i^l - \tilde{U}_i \hat{g}_i^l\|^2 \quad (11)$$

$$= y_i^{l*} y_i^l + \hat{g}_i^{l*}\tilde{U}_i^*\tilde{U}_i \hat{g}_i^l - \hat{g}_i^{l*}\tilde{U}_i^* y_i^l - y_i^{l*}\tilde{U}_i \hat{g}_i^l;\ i,\ l = 0, 1$$

An estimated test gain $\hat{g}_i^{l*}$ can be assumed to maintain a relationship of:

$$\frac{\partial e_i^l}{\partial \hat{g}_i^{l*}} = 0; i, l = 0, 1 \qquad (12)$$

Can be substituted to provide:

$$\hat{g}_i^l = (\tilde{U}_i^* \tilde{U}_i)^{-1} \tilde{U}_i^* y_i^l; i, l=0, 1. \qquad (13)$$

From $\hat{g}_i^{l*} = [\hat{h}_i^{l^T}, -\hat{R}_{DC}]^T$ the residual DC offset $R_{DC}$ can be computed with the test channel characteristic $\hat{h}_i^l = [\hat{h}_{0,i}^l, \ldots, \hat{h}_{0,i}^l]^T$; i, l=0, 1.

$H_i = [\hat{h}_i^1, \hat{h}_i^2]$ can represent the channel estimate based on GMSK or 8PSK modulation type.

In an alternative estimation process the residual DC offset 228 can be estimated by the channel estimation module 220 as:

$$\hat{R}_{DC} = \frac{1}{148} \sum_{n=59}^{84} \sum_{k=0}^{L-1} x_{n-k} \hat{h}_{k,i} \approx \frac{1}{148} \sum_{n=0}^{147} \sum_{k=0}^{L-1} x_{n-k} \hat{h}_{k,i} \qquad (14)$$

The residual DC offset 228 can be induced into the data by the direct conversion of the received signal 202 by the direct conversion receiver. The residual DC offset 228 can be removed by the DC offset removal module 230 to generate the corrected data 232.

Figure 3:
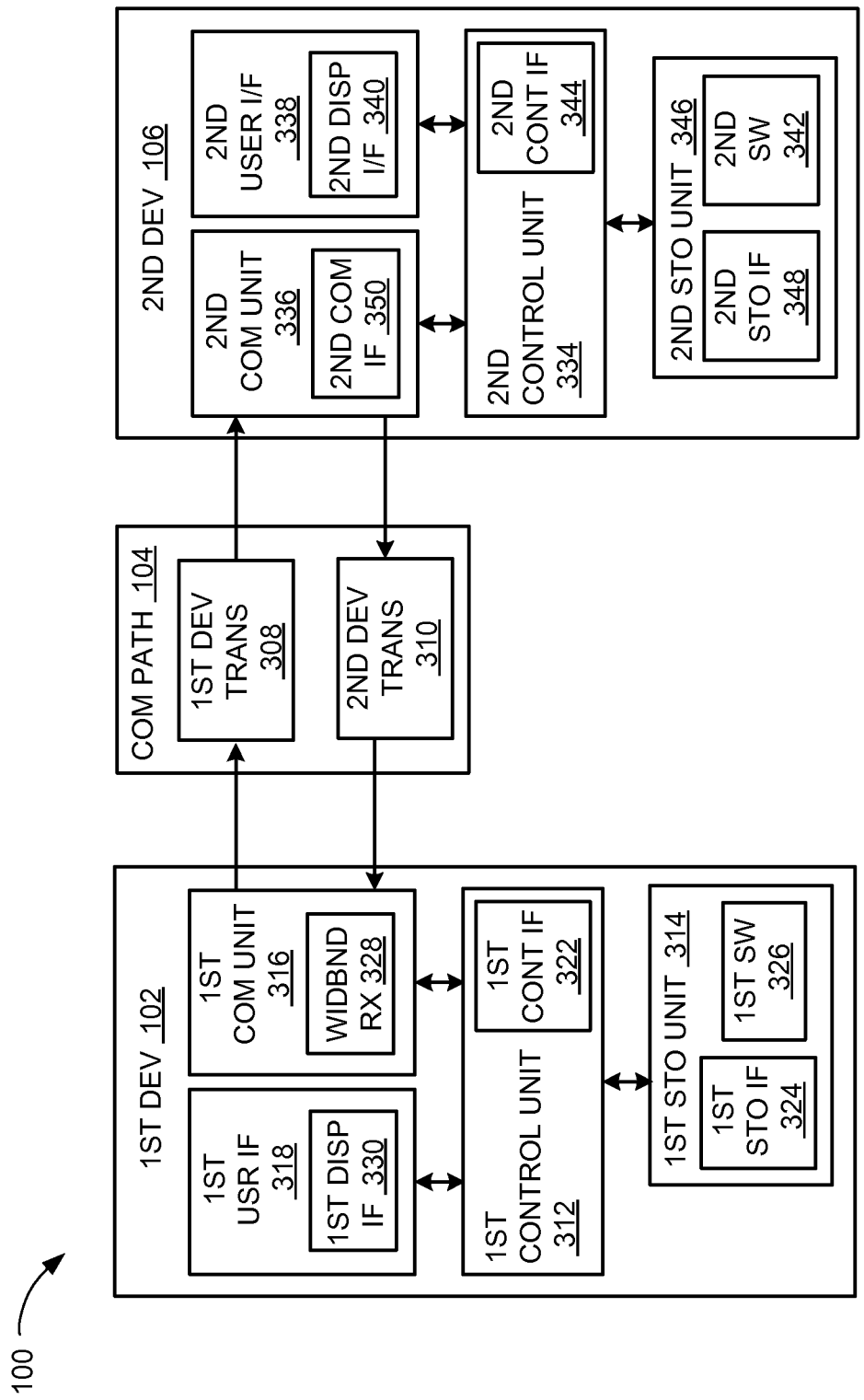
FIG. 3 is an exemplary block diagram of the wireless communication system.

Referring now to FIG. 3, therein is shown an exemplary block diagram of the wireless communication system 100. The wireless communication system 100 can include the first device 102, the communication path 104, and the second device 106. The first device 102 can send information in a first device transmission 308 over the communication path 104 to the second device 106. The second device 106 can send information in a second device transmission 310 over the communication path 104 to the first device 102.

For illustrative purposes, the wireless communication system 100 is shown with the first device 102 as a client device, although it is understood that the wireless communication system 100 can have the first device 102 as a different type of device. For example, the first device 102 can be a server having a wireless communication interface.

Also for illustrative purposes, the wireless communication system 100 is shown with the second device 106 as a server, although it is understood that the wireless communication system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control unit 312, a first storage unit 314, a first communication unit 316, and a first user interface 318. The first control unit 312 can include a first control interface 322. The first control unit 312 can execute a first software 326 to provide the intelligence of the wireless communication system 100.

The first control unit 312 can be implemented in a number of different manners. For example, the first control unit 312 can be a processor, an application specific integrated circuit (ASIC) an embedded processor, a microprocessor, a hardware control logic, a hardware finite state machine (FSM), a digital signal processor (DSP), or a combination thereof. The first control interface 322 can be used for communication between the first control unit 312 and other functional units in the first device 102. The first control interface 322 can also be used for communication that is external to the first device 102.

The first control interface 322 can receive information from the other functional units or from external sources, or can transmit information to the other functional units or to external destinations. The external sources and the external destinations refer to sources and destinations external to the first device 102.

The first control interface 322 can be implemented in different ways and can include different implementations depending on which functional units or external units are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof.

The first storage unit 314 can store the first software 326. The first storage unit 314 can also store the relevant information, such as data representing incoming images, data representing previously presented image, sound files, or a combination thereof.

The first storage unit 314 can be a volatile memory, a nonvolatile memory, an internal memory, an external memory, or a combination thereof. For example, the first storage unit 314 can be a nonvolatile storage such as nonvolatile random access memory (NVRAM), Flash memory, disk storage, or a volatile storage such as static random access memory (SRAM).

The first storage unit 314 can include a first storage interface 324. The first storage interface 324 can be used for communication between and other functional units in the first device 102. The first storage interface 324 can also be used for communication that is external to the first device 102.

The first storage interface 324 can receive information from the other functional units or from external sources, or can transmit information to the other functional units or to external destinations. The external sources and the external destinations refer to sources and destinations external to the first device 102.

The first storage interface 324 can include different implementations depending on which functional units or external units are being interfaced with the first storage unit 314. The first storage interface 324 can be implemented with technologies and techniques similar to the implementation of the first control interface 322.

The first communication unit 316 can enable external communication to and from the first device 102. For example, the first communication unit 316 can permit the first device 102 to communicate with the second device 106 of FIG. 1, an attachment, such as a peripheral device or a computer desktop, and the communication path 104.

The first communication unit 316 can also function as a communication hub allowing the first device 102 to function as part of the communication path 104 and not limited to be an end point or terminal unit to the communication path 104. The first communication unit 316 can include active and passive components, such as microelectronics or an antenna, for interaction with the communication path 104.

The first communication unit 316 can include a wideband receiver interface 328. The wideband receiver interface 328 can be used for communication between the first communication unit 316 and other functional units in the first device 102. The wideband receiver interface 328 can receive information from the other functional units or can transmit information to the other functional units.

The wideband receiver interface 328 can include different implementations depending on which functional units are being interfaced with the first communication unit 316. The wideband receiver interface 328 can be implemented with technologies and techniques similar to the implementation of the first control interface 322.

The first user interface 318 allows a user (not shown) to interface and interact with the first device 102. The first user interface 318 can include an input device and an output device. Examples of the input device of the first user interface 318 can include a keypad, a touchpad, soft-keys, a keyboard, a microphone, an infrared sensor for receiving remote signals, or any combination thereof to provide data and communication inputs.

The first user interface 318 can include a first display interface 330. The first display interface 330 can include a display, a projector, a video screen, a speaker, or any combination thereof.

The first control unit 312 can operate the first user interface 318 to display information generated by the wireless communication system 100. The first control unit 312 can also execute the first software 326 for the other functions of the wireless communication system 100. The first control unit 312 can further execute the first software 326 for interaction with the communication path 104 via the first communication unit 316.

The second device 106 can be optimized for implementing an embodiment of the present invention in a multiple device embodiment with the first device 102. The second device 106 can provide the additional or higher performance processing power compared to the first device 102. The second device 106 can include a second control unit 334, a second communication unit 336, and a second user interface 338.

The second user interface 338 allows a user (not shown) to interface and interact with the second device 106. The second user interface 338 can include an input device and an output device. Examples of the input device of the second user interface 338 can include a keypad, a touchpad, soft-keys, a keyboard, a microphone, or any combination thereof to provide data and communication inputs. Examples of the output device of the second user interface 338 can include a second display interface 340. The second display interface 340 can include a display, a projector, a video screen, a speaker, or any combination thereof.

The second control unit 334 can execute a second software 342 to provide the intelligence of the second device 106 of the wireless communication system 100. The second software 342 can operate in conjunction with the first software 326. The second control unit 334 can provide additional performance compared to the first control unit 312.

The second control unit 334 can operate the second user interface 338 to display information. The second control unit 334 can also execute the second software 342 for the other functions of the wireless communication system 100, including operating the second communication unit 336 to communicate with the first device 102 over the communication path 104.

The second control unit 334 can be implemented in a number of different manners. For example, the second control unit 334 can be a processor, an embedded processor, a microprocessor, hardware control logic, a hardware finite state machine (FSM), a digital signal processor (DSP), or a combination thereof.

The second control unit 334 can include a second controller interface 344. The second controller interface 344 can be used for communication between the second control unit 334 and other functional units in the second device 106. The second controller interface 344 can also be used for communication that is external to the second device 106.

The second controller interface 344 can receive information from the other functional units or from external sources, or can transmit information to the other functional units or to external destinations. The external sources and the external destinations refer to sources and destinations external to the second device 106.

The second controller interface 344 can be implemented in different ways and can include different implementations depending on which functional units or external units are being interfaced with the second controller interface 344. For example, the second controller interface 344 can be implemented with a pressure sensor, an inertial sensor, a microelectromechanical system (MEMS), optical circuitry, waveguides, wireless circuitry, wireline circuitry, or a combination thereof.

A second storage unit 346 can store the second software 342. The second storage unit 346 can also store the such as data representing incoming images, data representing previously presented image, sound files, or a combination thereof. The second storage unit 346 can be sized to provide the additional storage capacity to supplement the first storage unit 314.

For illustrative purposes, the second storage unit 346 is shown as a single element, although it is understood that the second storage unit 346 can be a distribution of storage elements. Also for illustrative purposes, the wireless communication system 100 is shown with the second storage unit 346 as a single hierarchy storage system, although it is understood that the wireless communication system 100 can have the second storage unit 346 in a different configuration. For example, the second storage unit 346 can be formed with different storage technologies forming a memory hierarchal system including different levels of caching, main memory, rotating media, or off-line storage.

The second storage unit 346 can be a volatile memory, a nonvolatile memory, an internal memory, an external memory, or a combination thereof. For example, the second storage unit 346 can be a nonvolatile storage such as non-volatile random access memory (NVRAM), Flash memory, disk storage, or a volatile storage such as static random access memory (SRAM).

The second storage unit 346 can include a second storage interface 348. The second storage interface 348 can be used for communication between other functional units in the second device 106. The second storage interface 348 can also be used for communication that is external to the second device 106.

The second storage interface 348 can receive information from the other functional units or from external sources, or can transmit information to the other functional units or to external destinations. The external sources and the external destinations refer to sources and destinations external to the second device 106.

The second storage interface 348 can include different implementations depending on which functional units or external units are being interfaced with the second storage unit 346. The second storage interface 348 can be implemented with technologies and techniques similar to the implementation of the second controller interface 344.

The second communication unit 336 can enable external communication to and from the second device 106. For example, the second communication unit 336 can permit the second device 106 to communicate with the first device 102 over the communication path 104.

The second communication unit 336 can also function as a communication hub allowing the second device 106 to function as part of the communication path 104 and not limited to be an end point or terminal unit to the communication path 104. The second communication unit 336 can include active and passive components, such as microelectronics or an antenna, for interaction with the communication path 104.

The second communication unit 336 can include a second communication interface 350. The second communication interface 350 can be used for communication between the second communication unit 336 and other functional units in the second device 106. The second communication interface 350 can receive information from the other functional units or can transmit information to the other functional units.

The second communication interface 350 can include different implementations depending on which functional units are being interfaced with the second communication unit 336. The second communication interface 350 can be implemented with technologies and techniques similar to the implementation of the second controller interface 344.

The first communication unit 316 can couple with the communication path 104 to send information to the second device 106 in the first device transmission 308. The second device 106 can receive information in the second communication unit 336 from the first device transmission 308 of the communication path 104.

The second communication unit 336 can couple with the communication path 104 to send information to the first device 102 in the second device transmission 310. The first device 102 can receive information in the first communication unit 316 from the second device transmission 310 of the communication path 104. The wireless communication system 100 can be executed by the first control unit 312, the second control unit 334, or a combination thereof. For illustrative purposes, the second device 106 is shown with the partition having the second user interface 338, the second storage unit 346, the second control unit 334, and the second communication unit 336, although it is understood that the second device 106 can have a different partition. For example, the second software 342 can be partitioned differently such that some or all of its function can be in the second control unit 334 and the second communication unit 336. Also, the second device 106 can include other functional units not shown in FIG. 3 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the wireless communication system 100 is described by operation of the first device 102 and the second device 106. It is understood that the first device 102 and the second device 106 can operate any of the modules and functions of the wireless communication system 100.

Figure 4:
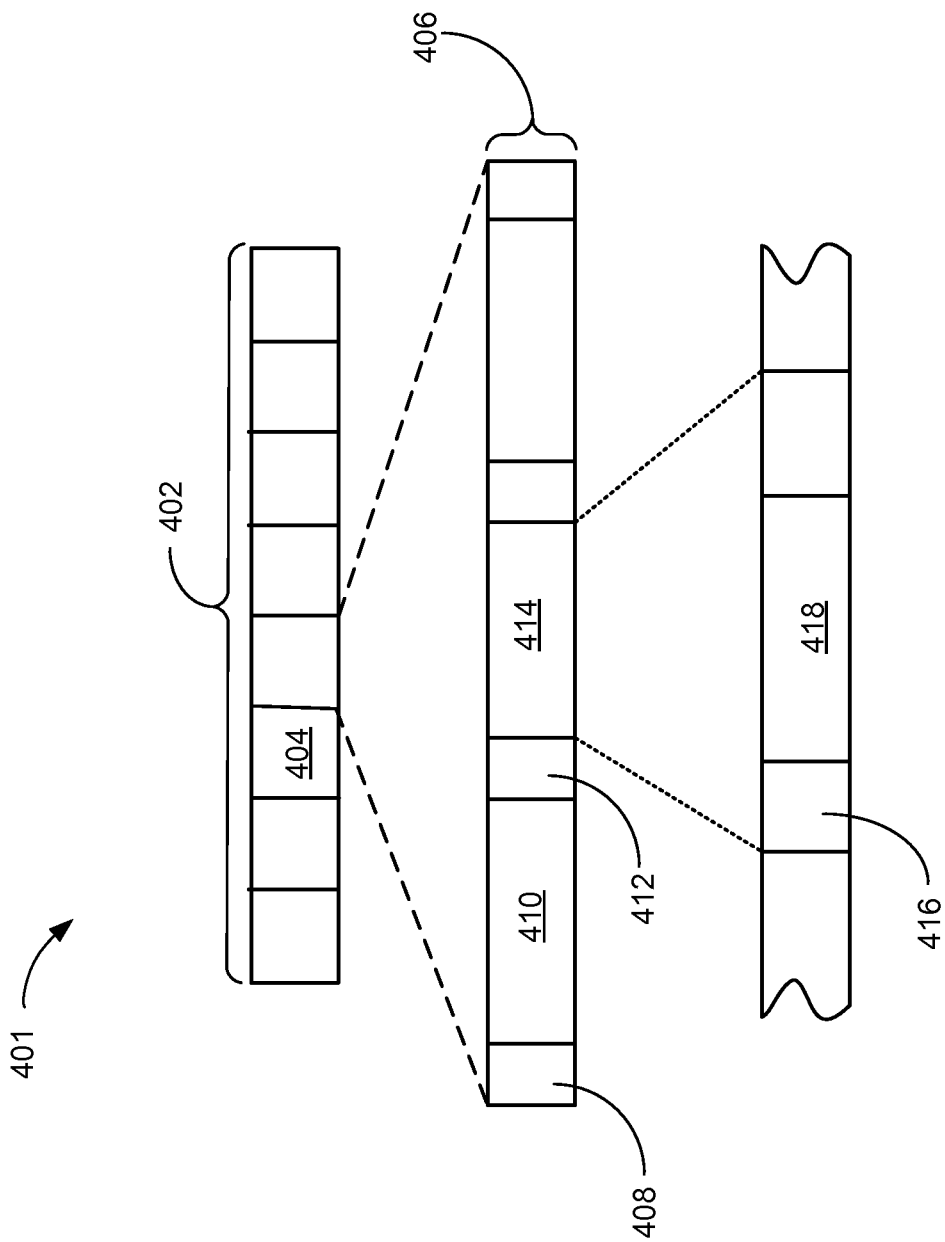
FIG. 4 is a schematic view of the fields of the communication protocol such as a time division multiple access (TDMA) frame.

Referring now to FIG. 4, therein is shown a schematic view of the fields of the communication protocol such as a time division multiple access (TDMA) frame 401. As an example, the schematic view of the fields of the communication protocol such as a TDMA frame 401 depicts a global system for mobile-communication (GSM) frame 402 in which there are eight instances of a time slot 404. Each of the time slot 404 can include communication data for an individual user (not shown). The time slot 404 can include one of four formats for the communication data within in the time slot 404. The data rate of each of the time slot 404 is 270.833 kilo-bits per second (kbps).

A selected burst 406 is set to have a fixed time of 577 μs which provides for a standard transmission of 156 symbols within the selected burst 406. The selected burst 406 can have four different formats including a normal burst, a frequency correction burst, a synchronization burst, or a random access burst. Since the normal burst is most commonly used to transport the user data, the selected burst 406 is shown to have the normal burst format.

The selected burst 406 is specified to have tail bits 408 at the beginning and the end of the selected burst 406. The tail bits 408 each contain 3 symbols that allow time for the input buffer 204 of FIG. 2 to power up and power down for processing the selected burst 406. The selected burst 406 will remain allocated to the individual user (not shown) as long as the communication sequence lasts. The selected burst 406 will be allocated in the same instance of the time slot 404 of each of the subsequent instances of the GSM frame 402.

The selected burst 406 contains two fields of an encrypted data 410. The encrypted data 410 contains 57 symbols of the communication data for the individual user. A flag bit 412 is located between both fields of the encrypted data 410 and a test sequence 414. The flag bit 412 is a single symbol that is used to indicate whether the content of the encrypted data 410 is communication data or control data.

The test sequence 414 is a 26 symbol field used to calibrate the wide band receiver 201 of FIG. 2. The test sequence 414 can include an inter-symbol interference (ISI) field 416 and an offset adjustment field 418. The offset adjustment field 418 can include 16 symbols with the remainder of the test sequence 414 split between the ISI field 416 located on either side of the offset adjustment field 418.

It has been discovered that the offset adjustment field 418 can be used by the channel estimation module 220 of FIG. 2 and the blind modulation detector 218 of FIG. 2 of the modulation selection module 240 of FIG. 2 to reduce the baseband signal processing complexity and decrease the power consumption of the wireless communication system 100 of FIG. 1 by providing joint modulation detection, residual DC offset calculation and channel estimation in a single module. The modulation selection module 240 can calculate adjustments for the noise component $v_{m,i}$, the channel component $\tilde{h}_{m,i}^{l}$, and the DC offset component $R_{DC}$ present in received signal 202 of FIG. 2 representing the GSM frame 402.

Figure 5:
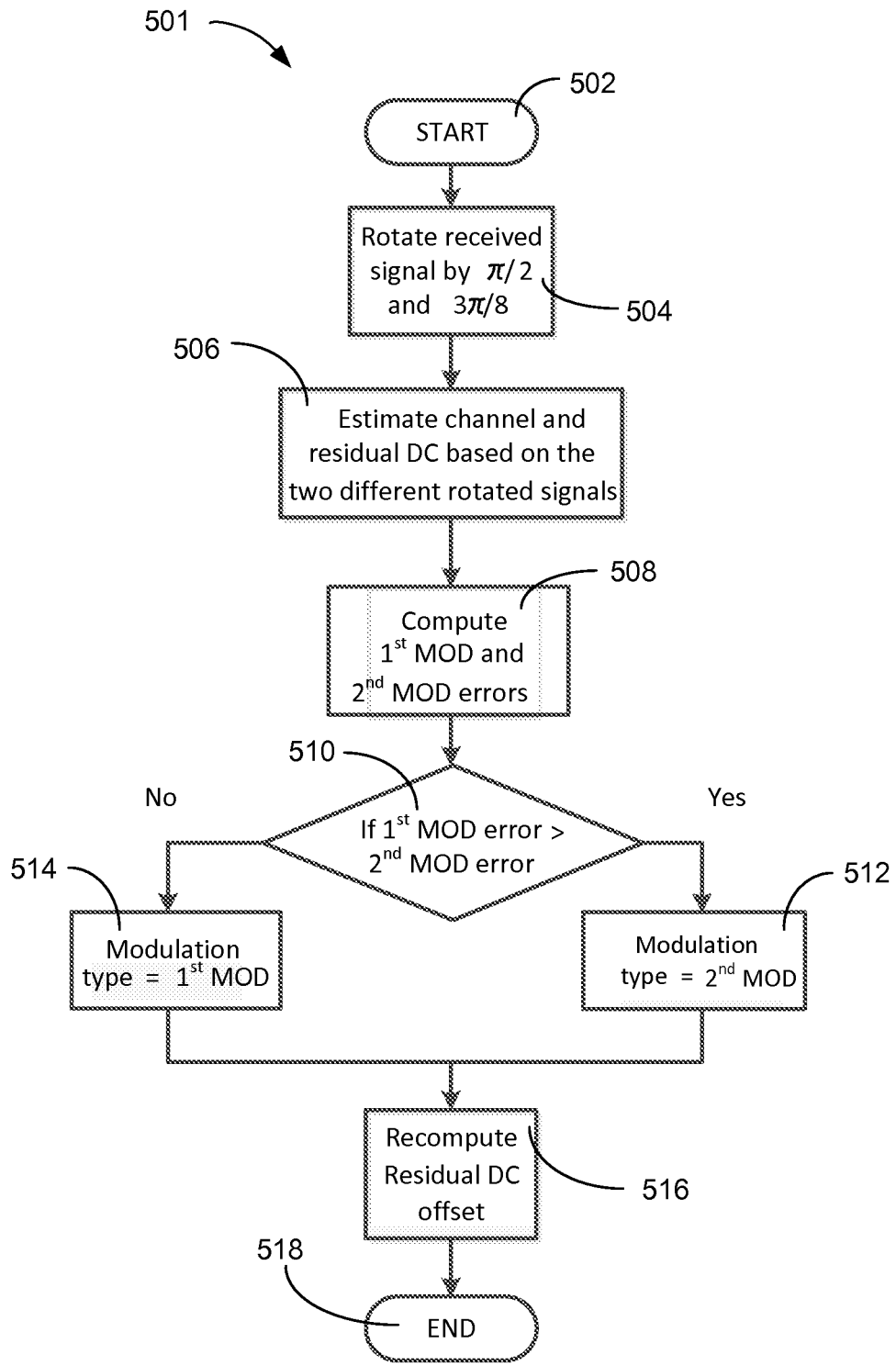
FIG. 5 is a control flow of the wireless communication system of FIG. 1.

Referring now to FIG. 5, therein is shown a control flow 501 of the wireless communication system 100 of FIG. 1. The control flow 501 depicts a start symbol 502 which can be recognition of the tail bits 408 of FIG. 4. During the start symbol 502 the input buffer 204 of FIG. 2 can be powered on in preparation for receiving the selected burst 406 of FIG. 4.

Once the input buffer 204 is powered on the flow proceeds to a rotate received signal module 504. The rotate received signal module 504 can receive the raw data 209 of FIG. 2 and process the raw data 209 by the first phase shifter 210 of FIG. 2 and the second phase shifter 212 of FIG. 2. The first phase shifter 210 can rotate the raw data 209 by $\pi/2$ while the second phase shifter 212 can rotate the raw data 209 by $3\pi/8$. This concurrent treatment of the raw data 209 can generate two different interpretations of the raw data 209 to assure a rapid determination of the modulation type and appropriate adjustments to the wide-band receiver 201 of FIG. 2.

The flow then proceeds to an estimate channel module 506. The estimate channel module 506 can calculate, with the aid of the modulation selection module 240 of FIG. 2, adjustments concurrently, for the noise component $v_{m,i}$, the channel component $\tilde{h}_{m,i}^{\ l}$, and the DC offset component $R_{DC}$, for the first modulation type and the second modulation type.

The flow then proceeds to a compute errors module 508, in which the error energy is calculated for both the first modulation type and the second modulation type. The compute errors module 508 can make use of the intermediate values generated in the modulation selection module 240 to calculate the error energy.

The flow then proceeds to a compare error module 510 to determine if the error energy for the first modulation type is greater than the error energy for the second modulation type. If the compare error module 510 determines that the error energy for the first modulation type is greater than the error energy for the second modulation type, the flow proceeds to a set second MOD module 512, such as indicating the 8PSK modulation type. The set second MOD module 512 can apply the adjustments generated for the second modulation type.

If the compare error module 510 determines that the error energy for the first modulation type is not greater than the error energy for the first modulation type, the flow proceeds to a set first MOD module 514, such as indicating the GMSK modulation type. The set first MOD module 514 can apply the adjustments generated for the first modulation type.

Once the modulation type is determined, by the set second MOD module 512 or the set First MOD module 514, the flow proceeds to a recomputed DC offset module 516. The recomputed DC offset module 516 can determine the amount of the residual DC offset 228 of FIG. 2 that should be corrected for by the DC offset removal module 230 of FIG. 2.

The flow then proceeds to an end module 518 which receives and interprets received data 238 of FIG. 2 based on the channel the equalizer 236 of FIG. 2 adjusted by the channel characteristic 234 of FIG. 2 as determined by the set second MOD module 512 or the set first MOD module 514. The remainder to the selected burst 406 of FIG. 4 can be processed utilizing the adjustments determined by the modulation selection module 240.

It is understood that the change in the channel characteristic 234 is very slow relative to the receipt of the next instance of the selected burst 406. All of the adjustments for the noise component $v_{m,i}$, the channel component $\tilde{h}_{m,i}^{\ l}$, and the DC offset component $R_{DC}$, can be updated based on the modulation scheme used by the next instance of the selected burst 406. It is further understood that the next instance of the selected burst 406 can be of a different modulation type in order to prevent undue exposure of the individual user (not shown) to a single type and power of radiated energy provided by the received signal 202 of FIG. 2.

It has been discovered that the wireless communication system 100 provides a reliable and accurate adjustment of the received signal 202 in order to produce the received data 238 of FIG. 2. The embodiment of the present invention provides the modulation selection module 240 of FIG. 2 to reduce the baseband signal processing complexity and decrease the power consumption of the wireless communication system 100 of FIG. 1. The utilization of the intermediate values within the modulation selection module 240 does reduce the power required by the wide-band receiver 201 while improving the bit error rate of the received data 238.

The modules described in this application can be hardware implementation or hardware accelerators or circuitry in the first control unit 316 of FIG. 3 or in the second control unit 338 of FIG. 3. The modules can also be hardware implementation or hardware accelerators or circuitry within the first device 102 of FIG. 1 or the second device 106 of FIG. 1 but outside of the first control unit 316 or the second control unit 338, respectively.

Figure 6:
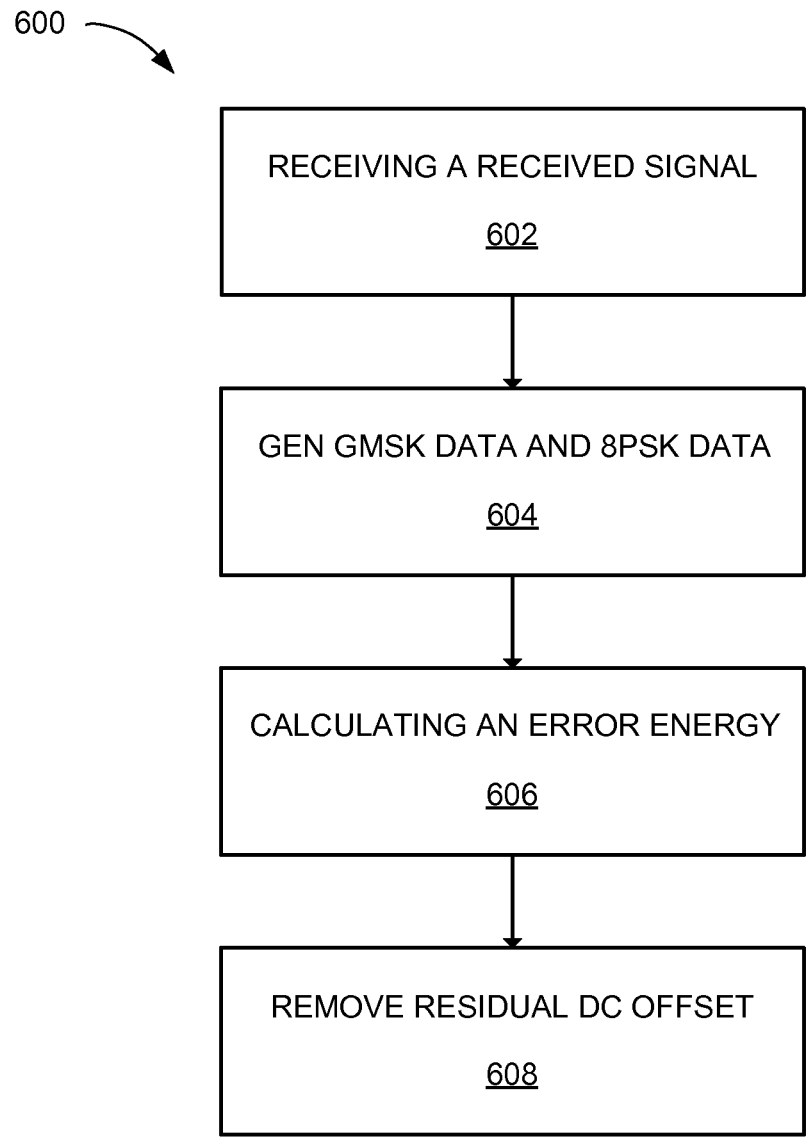
FIG. 6 is a flow chart of a method of operation of a wireless communication system in an embodiment of the present invention.

Referring now to FIG. 6, therein is shown a flow chart of a method 600 of operation of a wireless communication system 100 in an embodiment of the present invention. The method 600 includes: receiving a received signal in a block 602; generating concurrently a first modulation data and a second modulation data from the received signal in a block 604; calculating an error energy for the first modulation data and the second modulation data in a block 606; and removing a residual Direct Current (DC) offset from the received signal based on determining a minimum of the error energy for the first modulation data or the second modulation data in a block 608.

Blind modulation detection is an efficient technique to detect the modulation type of the selected burst 406 of FIG. 4 in the wireless communications system 100. In the blind modulation technique, the wide-band receiver 201 of FIG. 2 relies on the received signal 202 of FIG. 2 itself to detect the modulation type. The wide-band receiver 201 uses the test sequence 414 of FIG. 4 to derive metrics for each modulation types. These metrics are analyzed and the modulation type is determined based on an error checking module 510 of FIG. 5. As it described, GMSK is distinguished from 8PSK by different rotations $\pi/2$ and $3\pi/8$ relative to its prior symbol respectively. To drive these metrics, the test sequence 414 is rotated by $-\pi/2$ and $-3\pi/8$ concurrently in the two different paths. The de-rotated versions of the received signal 202 are utilized to estimate the two different channels based on the different phase rotations. The estimation errors are computed and the modulation type is determined by the minimum of the two errors 510 and can be utilized to adjust the channel characteristic 234 and remove the residual DC offset 234 from the received signal 202.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A wireless communication system comprising:
   an input buffer configured to receive a received signal;
   a first phase shifter and a second phase shifter, coupled to the input buffer configured to concurrently generate a first modulation data and a second modulation data from the received signal;
   a channel estimation module, coupled to the first phase shifter and the second phase shifter, configured to generate an error energy for the first modulation data and the second modulation data; and a direct current (DC) offset removal module, coupled to the channel estimation module, configured to remove a residual DC offset from the received signal based on a minimum of the error energy between the first modulation data or the second modulation data detected; and an equalizer, coupled to the channel estimation module, configured to adjust a channel characteristic.

2. The system as claimed in claim 1 further comprising a DC offset estimator coupled to the input buffer configured to receive the received signal.

3. The system as claimed in claim 1 wherein the equalizer is configured to receive a corrected data.

4. The system as claimed in claim 1 further comprising a blind modulation detector, coupled to the first phase shifter and the second phase shifter, configured to select the first modulation data or the second modulation data.

5. The system as claimed in claim 1 wherein calculating the error energy for the first modulation data and the second modulation data includes the channel estimation module configured to solve a least square error by $e_i^l = \|y_i^l - \tilde{U}_i \hat{g}_i^l\|^2 = y_i^{l*} y_i^l + \hat{g}_i^{l*} \tilde{U}_i^* \tilde{U}_i \hat{g}_i^l - \hat{g}_i^{l*} \tilde{U}_i y_i^l - y_i^{l*} \tilde{U}_i \hat{g}_i^l$; i, l=0, 1 for the first modulation data and the second modulation data.

6. The system as claimed in claim 5 further comprising an equalizer, coupled to the channel estimation module, configured to adjust a channel characteristic based on a minimum of the error energy between the first modulation data or the second modulation data determined 7. The system as claimed in claim 5 further comprising a DC offset estimator coupled to the input buffer configured to receive the received signal includes an adder coupled to the input buffer and the DC offset estimator.

8. The system as claimed in claim 5 further comprising an equalizer coupled to the DC offset removal module configured to receive a corrected data includes a channel characteristic coupled between the equalizer and the channel estimation module.

9. The system as claimed in claim 5 wherein the blind modulation detector is configured to select the first modulation data or the second modulation data includes a first modulation adjustment and a second modulation adjustment coupled between the channel estimation module and the blind modulation detector.

10. A method of operation of a wireless communication system comprising:

receiving a received signal;

generating concurrently a first modulation data and a second modulation data from the received signal;

calculating an error energy for the first modulation data and the second modulation data;

removing a residual direct current (DC) offset from the received signal based on determining a minimum of the error energy for the first modulation data or the second modulation data; and determining a channel characteristic based on determining a minimum of the error energy between the first modulation data or the second modulation data.

11. The method as claimed in claim 10 further comprising adjusting the channel characteristic.

12. The method as claimed in claim 10 further comprising generating a raw data from the received signal by subtracting a DC offset from the received signal.

13. The method as claimed in claim 10 wherein removing the residual direct current (DC) offset from the received signal includes generating a corrected data.

14. The method as claimed in claim 10 wherein calculating the error energy for the first modulation data and the second modulation data includes identifying a set first MOD module or a set second MOD module.

15. A wireless communication system comprising:

a communication unit configured to receive a received signal;

a first phase shifter and a second phase shifter, coupled to the received signal from the communication unit, configured to concurrently process a selected burst to generate a first modulation data and a second modulation data;

a channel estimation module, coupled to the first phase shifter and the second phase shifter, configured to calculate an error energy for the first modulation data and the second modulation data;

a direct current (DC) offset removal module configured to remove a residual direct current (DC) offset from the received signal based on a minimum of the error energy for the first modulation data or the second modulation data determined; and a blind modulation detector, coupled to the first modulation data, the second modulation data, and the channel estimation module, configured to pass the first modulation data or the second modulation data as determined by the channel estimation module.

16. The system as claimed in claim 15 further comprising an adder coupled between an input buffer and a DC offset estimator configured to generate a raw data from the received signal by subtracting a DC offset from the received signal.

17. The system as claimed in claim 15 wherein the channel estimation module, coupled to the first phase shifter and the second phase shifter, includes a DC offset removal module, coupled to the channel estimation module, configured to remove a residual Direct Current (DC) offset.

18. The system as claimed in claim 15 further comprising an equalizer, coupled to the channel estimation module and the direct current (DC) offset removal module, configured to generate received data from the received signal from the communication unit.

* * * * *